Oct. 20, 1925.
C. A. DOPP
GATE VALVE
Filed Dec. 20, 1923
1,557,926
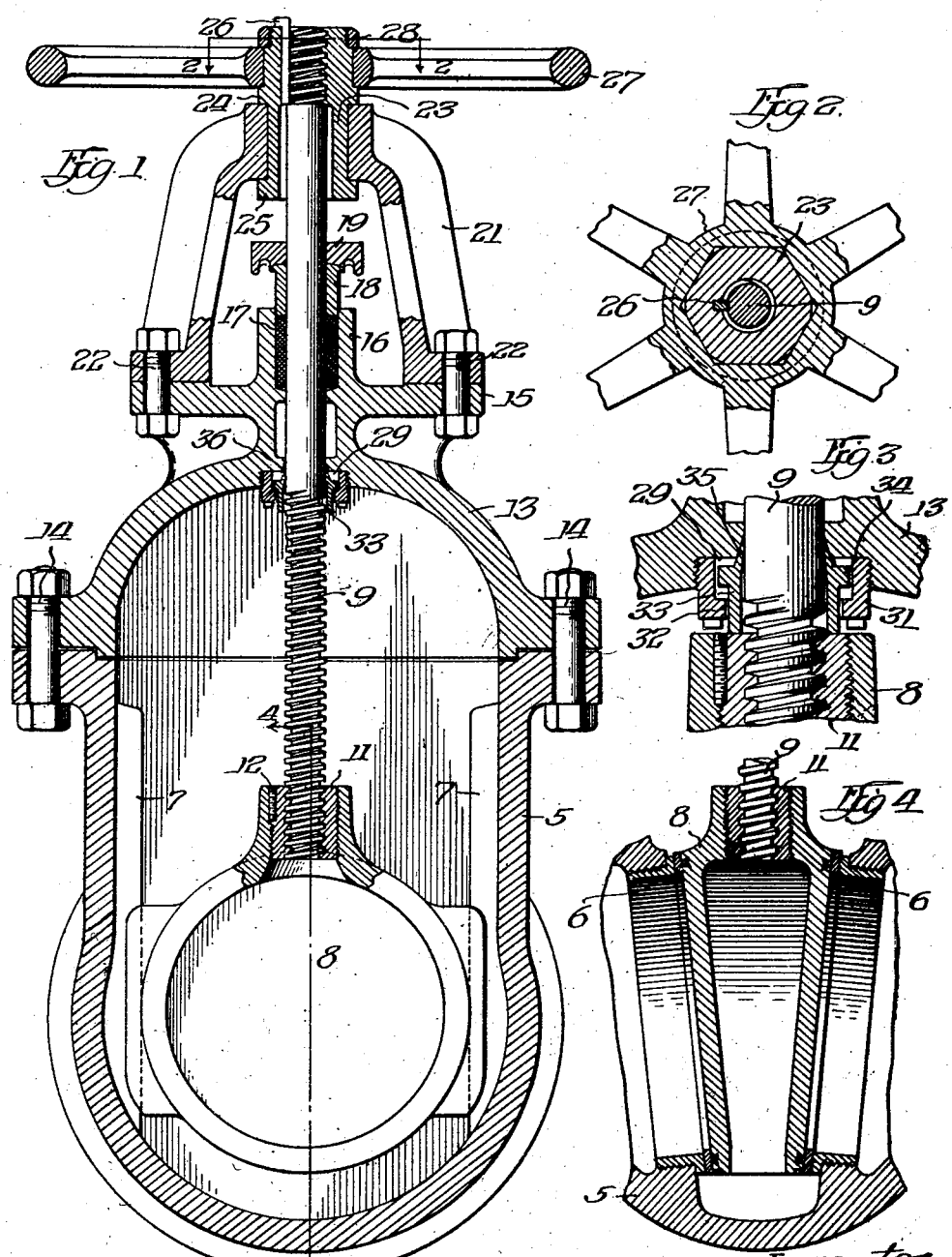

Patented Oct. 20, 1925.

1,557,926

UNITED STATES PATENT OFFICE.

CARL A. DOPP, OF CHICAGO, ILLINOIS, ASSIGNOR TO CRANE CO., OF CHICAGO, ILLINOIS, A CORPORATION OF ILLINOIS.

GATE VALVE.

Application filed December 20, 1923. Serial No. 681,694.

*To all whom it may concern:*

Be it known that I, CARL A. DOPP, a citizen of the United States, residing at Chicago, in the county of Cook and State of Illinois, have invented certain new and useful Improvements in Gate Valves, of which the following is a specification.

This invention pertains to gate valves adapted for high pressure as well as other service and has more particular reference to that type of gate valve commercially known as a non-rising stem valve.

Non-rising stem valves of this general character have heretofore so far as I am aware comprised a stuffing box surrounding the valve stem and mounted upon the valve bonnet. This construction necessarily involved a joint between the bonnet and the stuffing box structure through which joint leakage under high pressure was liable to occur.

One of the purposes of the present invention is to provide a non-rising stem valve in which the stuffing box is integrally associated with and forms a part of the valve bonnet so that no joint is afforded through which leakage might occur.

Another object of this invention is to provide a valve structure in which the thrust of the valve stem is exerted upon a collar carried by a yoke entirely outside the valve casing instead of within the casing or in the joint between the bonnet and the stuffing box as has heretofore been customary. Any wear of the parts resulting from this thrust cannot therefore result in leakage from the valve casing as it is apt to do in the prior valves where the thrust was resisted within instead of outside the casing.

A further purpose of the invention is to provide a valve in which the valve stem will be of uniform diameter from end to end and can be more economically made than a stem which was provided between its ends with a thrust collar such as has heretofore been employed. In these prior stems a rod or shaft of the desired diameter of the thrust collar was turned down to form the stem proper of the requisite diameter leaving the collar of the original diameter of the rod projecting from and formed integrally with the stem. The relative cost of production of a stem of uniform diameter from end to end, as compared with a stem provided with an integral collar and which stem was turned down to the required dimensions from the original diameter of the collar, should be apparent.

Another purpose of my present invention is to provide a valve which shall be so constructed that the motor may be readily mounted thereon when desired to convert the valve into a motor operated valve.

A further object is to provide an effective seal between the valve stem and the bonnet through which it passes, this seal being controlled by the opening of the valve disc which when fully opened forces the sealing ring into wedging relation between the valve stem and the bonnet.

Other objects and advantages of this invention should be readily appreciated as the same becomes better understood by reference to the following description when considered in connection with the accompanying drawings.

Referring to the drawings:

Fig. 1 is a vertical sectional view through a valve embodying my invention;

Fig. 2 is a fragmentary sectional view on the line 2—2 of Fig. 1;

Fig. 3 is an enlarged fragmentary view showing the seal between the valve stem and the bonnet; and Fig. 4 is a fragmentary sectional view on the line 4—4 of Fig. 1.

Referring now to the drawings more in detail, reference character 5 indicates generally the casing of the valve which is provided with the usual valve seats 6 and the guides 7 by which the valve disc indicated generally by reference character 8 is guided in its reciprocatory movements. The disc is hollow as shown in Fig. 4 in order to accommodate the lower threaded end of the valve stem 9 as the disc travels upwardly upon rotation of the stem, by reason of the threaded connection between the stem and the tapped bushing 11 which is threaded into the upper end of the disc and locked against displacement by a screw 12.

Upon the valve casing is mounted the bonnet 13 which is secured to the casing by bolts 14, suitable gaskets being interposed between the casing and the bonnet to prevent leakage at the joint. The top of the bonnet is provided with a central opening to accommodate the valve stem which projects therethrough and is formed to provide a ledge or flange 15 from which the body 16 of a stuffing box projects upwardly around the stem. This body is filled with packing 17 which is forced snugly around the stem so as to prevent leakage, by a follower member 18 which in turn is depressed by a head or cap 19 attached to the bonnet by adjustable drawbolts (not shown).

An upstanding yoke 21, preferably formed in two parts, is secured to the bonnet ledge 15 by bolts 22, and within the crown of the yoke a thrust sleeve 23 is rotatably mounted and provided above and beneath the yoke with flanges 24 and 25, respectively, through which the end thrust of the valve stem is transmitted to the yoke. This sleeve is threaded onto the upper end of the stem 9 to which it is locked by a key 26. The upper portion of the sleeve is polygonal in shape as will be apparent from Fig. 2 and an operating wheel herein shown as a handwheel 27 fits over this polygonal portion of the sleeve and is held against displacement therefrom by a lock nut 28 threaded onto the upper end of the sleeve.

It will be apparent that the stuffing box being formed integrally with the bonnet there is no joint between the stuffing box and the bonnet through which leakage might take place. Furthermore, the end thrust of the valve stem being taken up by the sleeve 23 which is entirely outside the valve casing, there is no possibility of leakage resulting from wear of the parts heretofore located beneath the stuffing box and designed to take care of the stem and thrust.

During normal operations of the valve the stuffing box packing prevents all leakage along the valve stem but since it sometimes becomes necessary to replace the stuffing box packing, my invention contemplates the provision of means whereby these repairs may be made without leakage and with the valve open even on a high pressure line. With this end in view the inner face of the bonnet surrounding the stem is provided with a recess 29 which is tapped to receive a cylindrical member 31 threaded into the recess and provided at its lower end with an inwardly extending supporting flange 32, all as best shown in Fig. 3. A sealing ring or sleeve 33 is disposed within this member and provided with a circumferential flange 34 which normally rests upon and is supported by the flange 32, thereby retaining the sleeve in position. The upper end of this sleeve is tapered as indicated by reference character 35 and the opening through the bonnet around the stem is likewise tapered as indicated at 36 to receive the upper tapered end of the sealing sleeve. Normally the parts assume the position shown in Fig. 1, and the sealing sleeve slidingly embraces the stem. When, however, the valve is fully opened, the upper end thereof as it approaches its fully opened position engages the lower projecting end of the sleeve 33 and carries this sleeve upwardly forcing its tapered upper end 35 into wedging engagement with the stem and the surrounding tapered walls of the bonnet opening through which the stem projects. The sleeve 33 being preferably made of ductile material conforms readily to the contour of the stem and the surrounding tapered walls, so that it wedges tightly around the stem and against the tapered walls providing an effectual seal at this point to prevent leakage along the stem. When the parts are in this position with the stem opening sealed by the sleeve 33, the stuffing box packing may be released and replaced as occasion demands without danger of leakage along the stem even under high pressure, and furthermore, these repairs may be made without the necessity of closing the valve and shutting off the line. When the stem is again rotated to close the valve, the sleeve 33 will under the influence of the rotating stem and the action of gravity, become disengaged from its wedging and sealing position and will resume the normal position illustrated in Fig. 1.

The phrases "substantially uniform diameter", "uniform diameter", and "equal diameter throughout its length", if and when used in the claims, are intended to mean that the stem of the valve has no projection, protuberance, or taper which serves as a thrust collar integral with the stem, and that the stem is of substantially uniform diameter through its length, with the possible exception of the threaded or otherwise formed end portions whereby they are adapted for connection to the valve gate and wheel or operating means.

It is believed that the construction, operation and many of the inherent advantages of this invention will be understood from the foregoing without further description and it should be manifest that many changes in the structural details illustrated and described may be resorted to without departing from the essentials of the invention as defined in the following claims.

I claim:

1. In a gate valve the combination of a casing; a bonnet mounted thereon and provided with a stuffing box, a yoke mounted on said bonnet, an operating wheel rotatably carried by said yoke, a valve stem of substantially uniform diameter fixedly connected to said wheel and projecting through said stuffing box and bonnet into said casing, a valve disc threadedly connected with said stem, and means for effecting a seal between said bonnet and said stem.

2. In a gate valve the combination of a casing, a bonnet mounted thereon and provided with a stuffing box, a rigid yoke mounted on said bonnet, an operating wheel rotatably carried by the yoke, and a stem of uniform diameter fixedly connected to said wheel at its upper end and projecting through said stuffing box and bonnet into said casing, and a valve disc threadedly connected to the lower end of said stem within the casing.

3. In a gate valve the combination of a casing, a bonnet mounted thereon and provided with a stuffing box body integral with the bonnet, a valve stem of uniform diameter projecting through said bonnet and stuffing box, a valve disc threadedly connected with the inner end of said stem, and means connected with the outer end of said stem whereby the stem is held against longitudinal movement and whereby said stem may be rotated.

4. In a gate valve the combination of a casing, a bonnet equipped with a stuffing box, a stem projecting through said bonnet and stuffing box, a yoke mounted on said bonnet, a thrust sleeve rotatably mounted in said yoke and secured to said stem, and means above the yoke and mounted on said sleeve whereby said stem may be rotated.

5. In a gate valve the combination of a casing, a bonnet equipped with a stuffing box, a yoke mounted on said bonnet, a stem projecting through said bonnet and stuffing box and being of uniform diameter from a point within the bonnet substantially through said yoke, a thrust sleeve rotatably mounted in said yoke and in cooperative turning engagement with said stem, and means engaging said sleeve whereby said stem may be rotated.

6. In a gate valve the combination of a casing, a bonnet provided with a stuffing box, a valve stem extending through said bonnet and stuffing box, a valve disc threadedly connected with the inner end of said stem, means for rotating said stem, and means carried by the bonnet for effecting a seal between said bonnet and said stem independently of said stuffing box.

7. In a gate valve the combination of a casing, a bonnet, a valve stem projecting through said bonnet, a valve disc threadedly connected with the inner end of said stem, means for rotating said stem, and means carried by said bonnet movable relatively to said stem and controlled by movement of said valve disc for effecting a seal between said stem and said bonnet.

8. In a gate valve the combination of a valve casing, a bonnet, a stem of equal diameter throughout its length projecting through said bonnet, a valve disc threadedly connected with said stem within the casing, and means independent of said stem and disc adapted to be engaged by said valve disc as the same approaches the limit of its opening movement for effecting a seal between said stem and said bonnet.

9. In a gate valve the combination of a valve casing, a bonnet, a stem projecting through said bonnet, a tapered sealing sleeve surrounding said stem within the bonnet, and means operated by rotating movement of said stem for causing said sleeve to effect a seal between said stem and said bonnet.

10. In a gate valve the combination of a casing, a bonnet, a stem projecting through said bonnet, a tapered sealing sleeve surrounding said stem within the bonnet, and means movable relatively to said stem for wedging said sleeve between said stem and said bonnet to prevent leakage around the stem.

11. In a gate valve the combination of a casing, a bonnet provided with a tapered opening, a valve stem projecting through said opening, a tapered sealing sleeve surrounding the stem, means for supporting said sleeve upon said bonnet, and a valve disc threadedly associated with said stem within the casing, said disc being adapted when approaching the limit of its opening movement to engage said sleeve and force the same into wedging relation between said stem and said bonnet.

12. In a gate valve the combination of a casing, a bonnet mounted thereon and provided with a stuffing box, a yoke mounted on said bonnet, means rotatably carried by said yoke to operate the valve, a stem of uniform diameter fixedly connected to said operating means at the upper end thereof and projecting through said stuffing box and bonnet into said casing, a valve disk threadedly connected to the lower end of said stem within said casing, and means carried by said bonnet movable relatively to said stem and controlled by movement of said valve disk for effecting a seal between said stem and said bonnet.

13. In a gate valve the combination of a casing, a bonnet equipped with a stuffing box, a stem projecting through said bonnet and stuffing box, a yoke mounted on said bonnet, a thrust sleeve rotatably mounted in said yoke and secured to said stem, means above the yoke and mounted on said sleeve whereby said stem may be rotated, means carried by said bonnet movable relatively to said stem to effect a seal between said stem and bonnet and means carried by said stem and controlled by movement thereof adapted to move said seal effecting means into sealing position.

14. A non-rising stem gate valve comprising, a valve body, a valve bonnet mounted on said body, a yoke mounted on said bonnet, a stem projecting through said bonnet and yoke, means to effect a seal between said stem and bonnet, a thrust sleeve mounted through said yoke about said stem and having thrust collars on each side of said yoke, means securing said sleeve to said stem and means for rotating said sleeve.

CARL A. DOPP.